Aug. 29, 1967
R. C. LOHRS ETAL
3,338,103
DIAL INSTRUMENT
Filed June 7, 1965
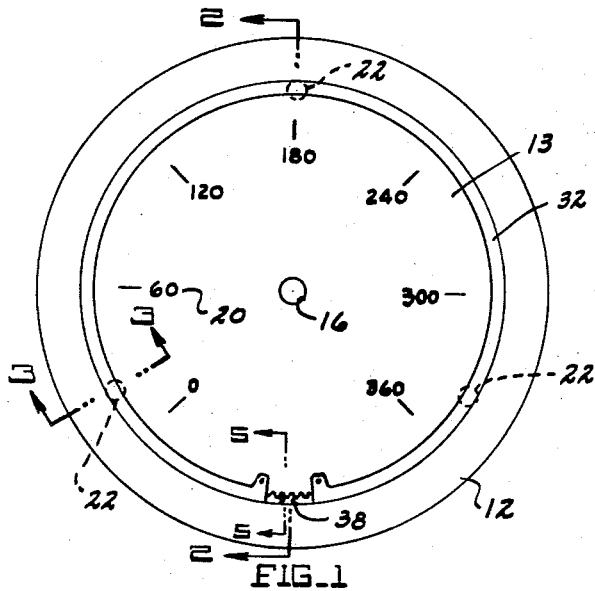
FIG_1
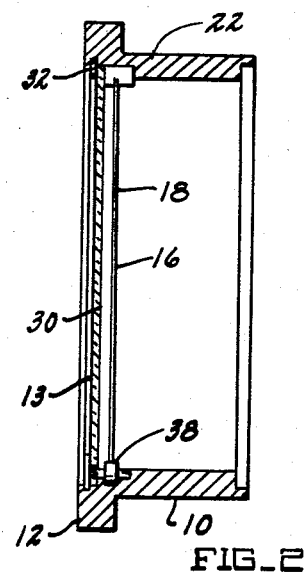
FIG_2
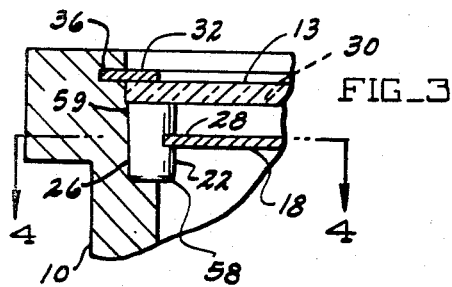
FIG_3
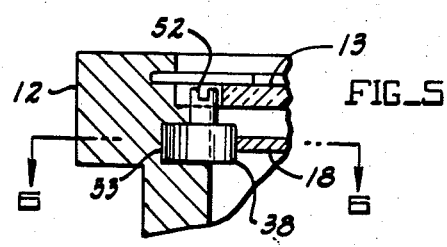
FIG_5
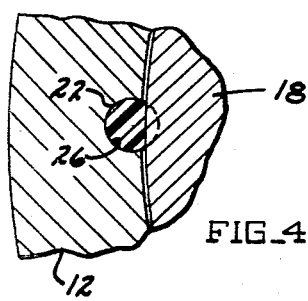
FIG_4
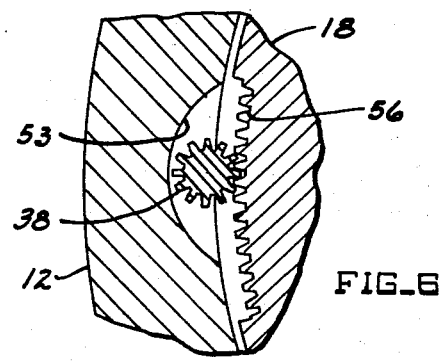
FIG_6
INVENTORS
ROBERT C. LOHRS
BY ERICH HIMSTEDT
JOHN E. McRAE
TENNES I. ERSTAD
ATTORNEYS

3,338,103
DIAL INSTRUMENT
Robert Carl Lohrs, Glendora, and Erich Himstedt, Monrovia, Calif., assignors to American Radiator & Standard Sanitary Corporation, New York, N.Y., a corporation of Delaware
Filed June 7, 1965, Ser. No. 461,964
7 Claims. (Cl. 73—431)

ABSTRACT OF THE DISCLOSURE

A calibration mechanism for a dial instrument, comprising a series of plastic buttons or plugs disposed in pockets about the periphery of the dial plate to grip edge areas of the plate firmly but without such adhesion as would prevent calibration movement of the plate.

---

This invention relates to dial instruments having normally stationary dial plates which can be rotatably adjusted to recalibrate the instrument during service. U.S. Patents 873,034 and 3,096,651 disclose instruments having dial recalibration features.

In the drawings:

FIGURE 1 is a front view of a dial instrument having features of the invention incorporated therein;

FIG. 2 is a sectional view taken on line 2—2 in FIG. 1;

FIG. 3 is an enlarged sectional view taken on line 3—3 in FIG. 1;

FIG. 4 is a sectional view taken on line 4—4 in FIG. 3;

FIG. 5 is an enlarged sectional view taken on line 5—5 in FIG. 1; and

FIG. 6 is a sectional view taken on line 6—6 in FIG. 5.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In FIGS. 1 and 2 of the drawings there is shown a dial instrument comprising a case having a tubular or annular side wall 10 and a mounting flange 12. The front of the case is closed by a viewing crystal 13, and the rear of the case is opened to receive a non-illustrated back plate which mounts certain condition-sensing mechanisms such as for example a Bourdon tube, bellows, diaphragms, bimetal coil, etc. Different conditions may be sensed, including temperature, liquid level, electric current or fluid pressure. In such condition-sensing instruments the condition sensing mechanism may be suitably connected to a stem which extends through an opening 16 in a circular dial plate 18, said stem having a radial pointer affixed thereto in the space between dial plate 18 and crystal 13 for read-out against the dial plate graduations 20.

During service the instrument may for various reasons work itself out of calibration, in which case it is desirable to be able to manually rotate dial plate 18 about its central axis to recalibrate the dial plate graduations 20 with the radial pointer. In the illustrated instrument the normally stationary dial plate 18 is adjustably mounted in case 10 by means of three plug-like mounting elements 22 located at circumferentially spaced points about the dial plate periphery. As shown best in FIGS. 3 and 4, each plug element is of a circular cross section which snugly conforms to the internal cross section of a pocket 26 formed in the instrument case wall 10. Each plug has a side surface exposed to the instrument case interior, said exposed side surface having a slot 28 therein which receives an edge portion of the dial plate 18. Each plug 22 is formed of a resilient material having cold flow characteristics, one suitable preferred material being glass-filled polytetrafluoroethylene having 20–25% glass fill, one ready source of said material being The Fluorocarbon Company of Anaheim, California.

In assembling the dial plate into the instrument case the three plugs 22 are first positioned around the dial plate edges as shown in FIG. 1. Thereafter the plugs are inserted downwardly into the pockets 26 to the FIG. 3 position. Subsequently crystal 13 is positioned on the annular shoulder 30 of the case, and the retaining ring 32 is sprung into the annular groove 36 to retain the crystal in its FIG. 3 position where it locks the plugs 22 in the pockets 26.

To facilitate rotary adustment of dial plate 18 there is provided a pinion gear 38 having a stub shaft 52 equipped with a screwdriver slot in its end face. The pinion gear 38 is located in a shallow recess 53 in the case wall, and the stub shafts are located in or on circular bearing surfaces of the case wall so that the pinion gear is trapped between the instrument case and the teeth 56 formed on the periphery of dial plate 18. It will be apparent that manual rotation of the pinion gear effects rotary adjustment of the dial plate to provide the desired calibration.

Gear 38 is preferably installed before dial plate 18 and mounting plugs 22. Thus gear 38 is positioned as shown in FIG. 5, and then the plugs 22—plate 18 assembly is mounted in the case as previously described. When plugs 22 are partially inserted into pockets 26, gear 38 may be rotated slightly to align its teeth with the teeth 36 on plate 18. If the dial plate 18 is formed with sufficient flexibility it can be installed before gear 38, in which case the plate can be depressed to let the gear drop into recess 53. The dial plate can then be released to assume the FIG. 5 condition.

It will be noted from FIG. 3 that each plug 22 is provided with a rounded lower edge 58. During assembly of the plugs into pockets 26 rounded edge 58 helps to align each plug 22 with its respective socket. To facilitate insertional movement of the plugs into the sockets a slight entrance angle on the order of fifteen degrees may be provided on the outer side surface portions of the socket side walls. These entrance angles, denoted by numeral 59 in FIG. 3, act as cam surfaces to guide the plugs into the pockets in spite of tolerance build up due to variations in dial plate 18, the size of each pocket 26, the diameter of each plug 22, or the spacing between each pocket 26 and the axis of dial plate 18. Since each plug 22 is resilient and subject to cold flow, the various plugs can be forced into the pockets even though dial plate 18 may be somewhat oversize. The edge of plate 18 can thus dig into the bight portion of slot 28, and the plug material can cold flow to compensate for the tolerance build up.

Slots 28 are made deep enough so that with perfectly dimensioned parts the slot bight surface will be deformed by the edge of the dial plate. Some oversize or undersize parts can be tolerated without materially changing this interference fit. Cold flow of the polytetrafluoroethylene plug will enable the plug to correctly grip and retain the dial plate in spite of tolerance build up. When it is desired to adjust the dial plate with pinion 38 the flowed plugs will offer uniform resistance to movement. Thus the arrangement can be manufactured to give a desired compromise between ready adjustment and calibration retention under high shock, high vibration conditions.

The invention can be practiced in other forms than the specific construction shown in the drawings, the scope of the invention being more particularly recited in the accompanying claims.

What is claimed:

1. A dial instrument comprising a case having an annular side wall; said side wall having an end shoulder surface defining an open mouth for the case; said side wall having a series of circumferentially spaced pockets extending from said shoulder surface; a normally stationary dial plate disposed within the case; and a plurality of spaced mounting elements locked within the pockets and located to grip circumferentially spaced edge areas of the dial plate; means for rotatably shifting the dial plate with respect to said mounting elements; said mounting elements being formed of resilient plastic material having cold flow characteristics, whereby said elements grip the dial plate irrespective of tolerance build up due to manufactured variations in case diameter, dial diameter, mounting element location or mounting element dimension.

2. The instrument of claim 1, wherein each mounting element is formed of glass-filled polyetetrafluoroethylene.

3. The instrument of claim 1 wherein each mounting element comprises a cylindrical plug having its axis disposed normal to the plane of the dial plate; each plug having a slot in its side surface receiving an edge area of the dial plate.

4. The instrument of claim 3 wherein said pockets and plugs have cooperating cam surfaces which enable the plugs to be assembled into the pockets even though the gripped dial plate might otherwise interfere with correct plug-pocket alignment.

5. The instrument of claim 3 and further comprising a crystal seated on the shoulder surface and overlying the plugs to retain same in their pockets.

6. The combination of claim 1 and wherein the side wall is formed with a recess in its internal side surface and wherein the means for rotatably shifting the dial plate comprise a pinion gear disposed in said recess adjacent the dial plate periphery; said dial plate having a portion of its peripheral edge configured to define gear teeth in mesh with the pinion gear, whereby manual rotation of the pinion gear is effective to adjust the rotated position of the plate.

7. A dial instrument comprising a case internally contoured to define an annular shoulder; a series of pockets formed in circumferentially spaced areas of said shoulder; a plug of resilient material having cold flow characteristics seated in each pocket; each pocket only partially encircling the side surface of its plug whereby a portion of the plug side surface is exposed to the case interior; each plug having a slot in its exposed side surface; a dial plate disposed within the case with its edge areas extending into the plug slots; means for rotatably shifting the dial plate with respect to the plugs; and a crystal seated on the annular shoulder to lock the plugs in their pockets.

References Cited

UNITED STATES PATENTS

| | | | |
|---|---|---|---|
| 2,367,449 | 1/1949 | Triplett | 324—156 X |
| 2,864,057 | 12/1958 | Connelly et al. | 324—156 |
| 3,112,091 | 11/1963 | Snyder | 73—431 X |
| 3,263,503 | 8/1966 | White | 73—431 |

LOUIS R. PRINCE, *Primary Examiner.*

F. SHOON, *Assistant Examiner.*